E. P. LINDAHL.
METHOD OF AND APPARATUS FOR MANUFACTURING GLASSWARE.
APPLICATION FILED SEPT. 7, 1918.
1,338,941.
Patented May 4, 1920.
8 SHEETS—SHEET 5.
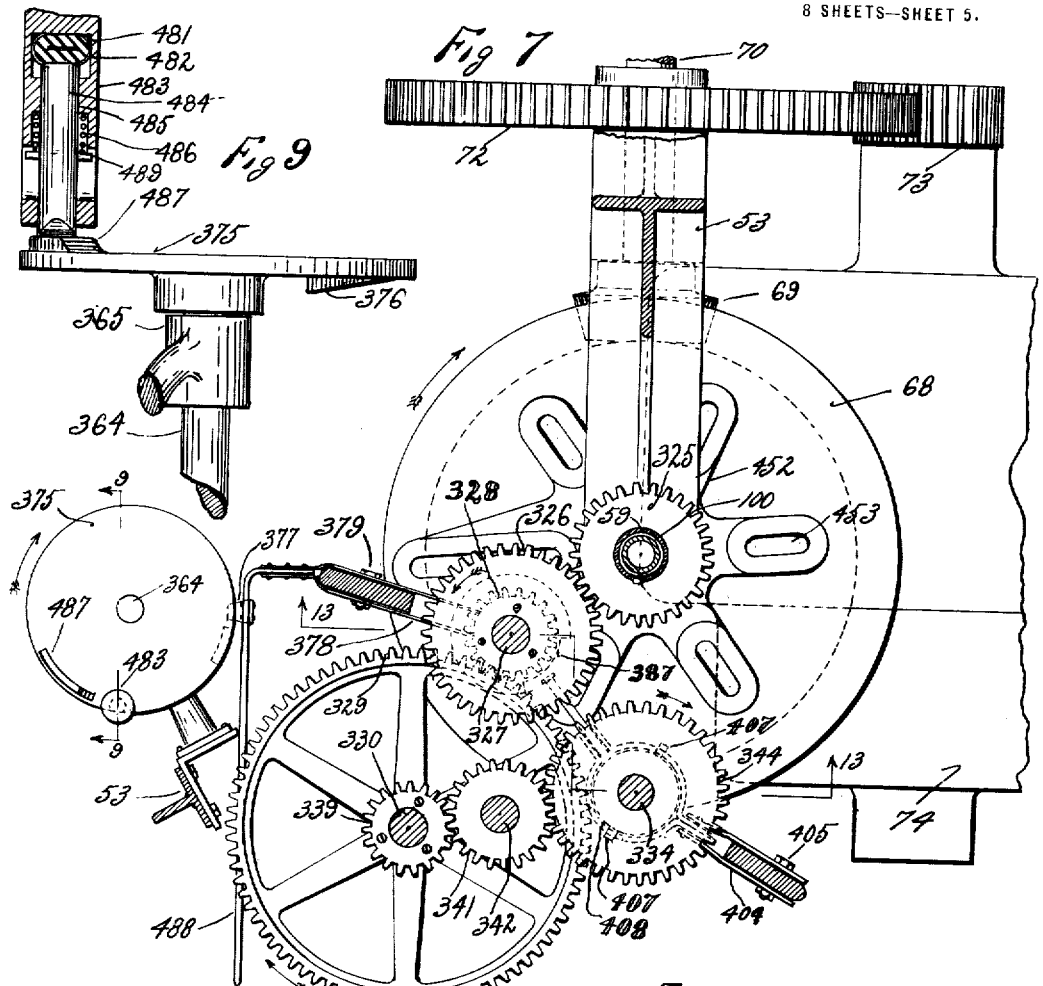
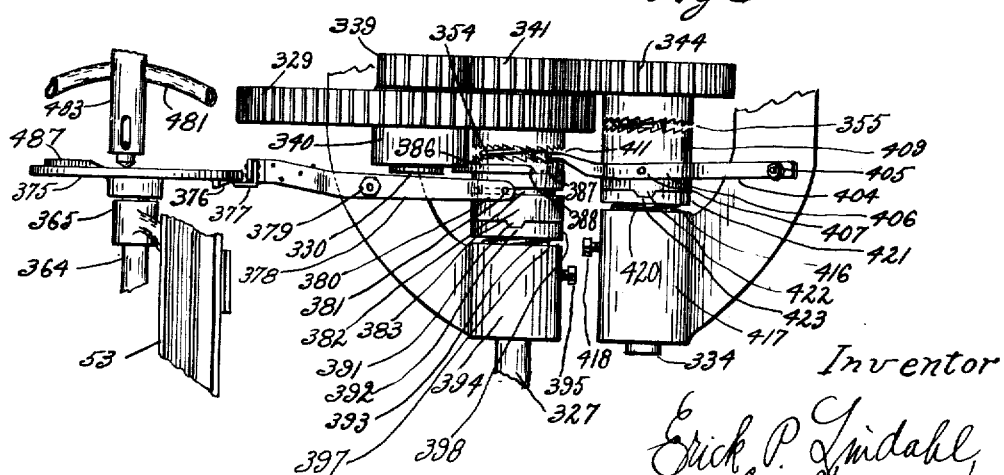

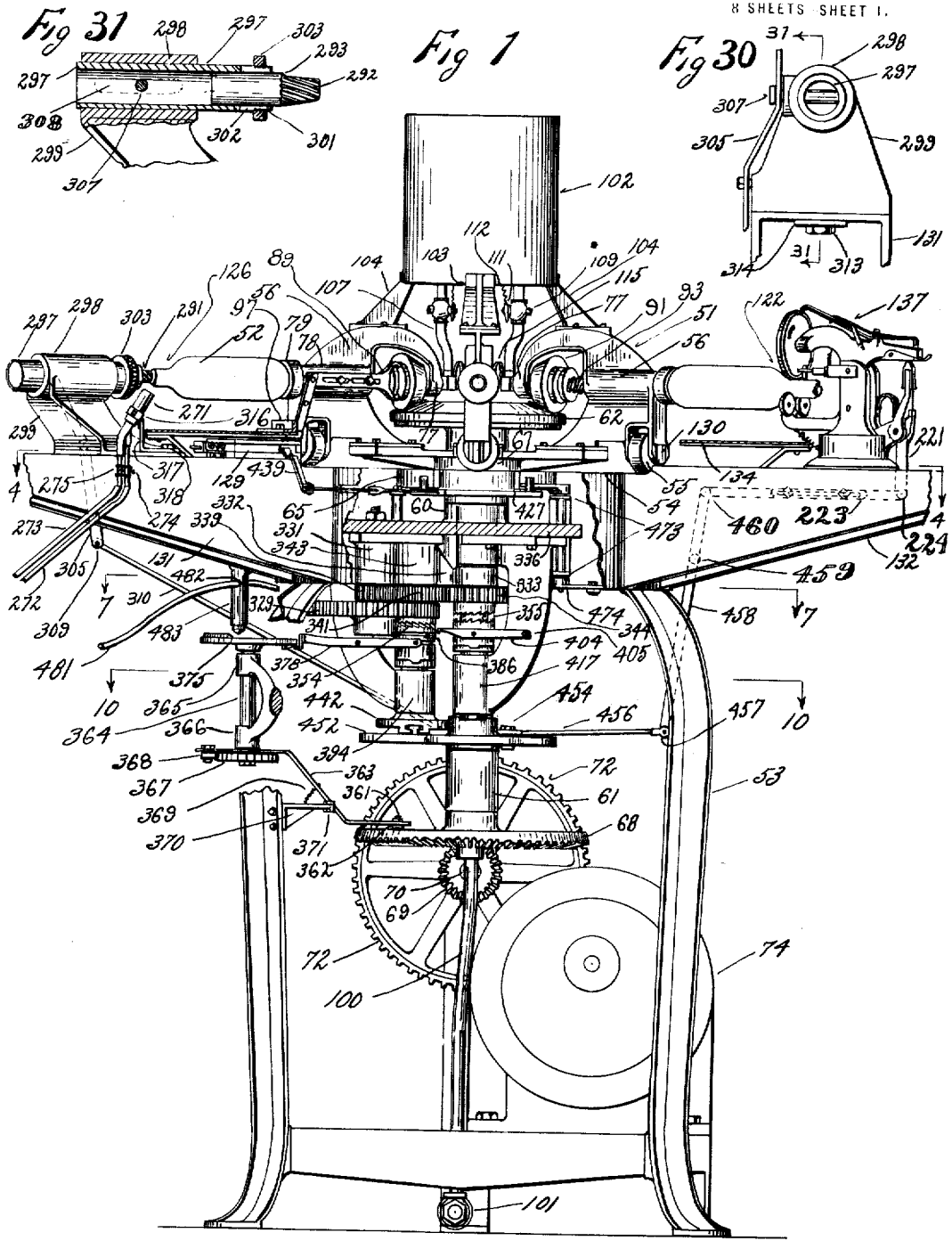

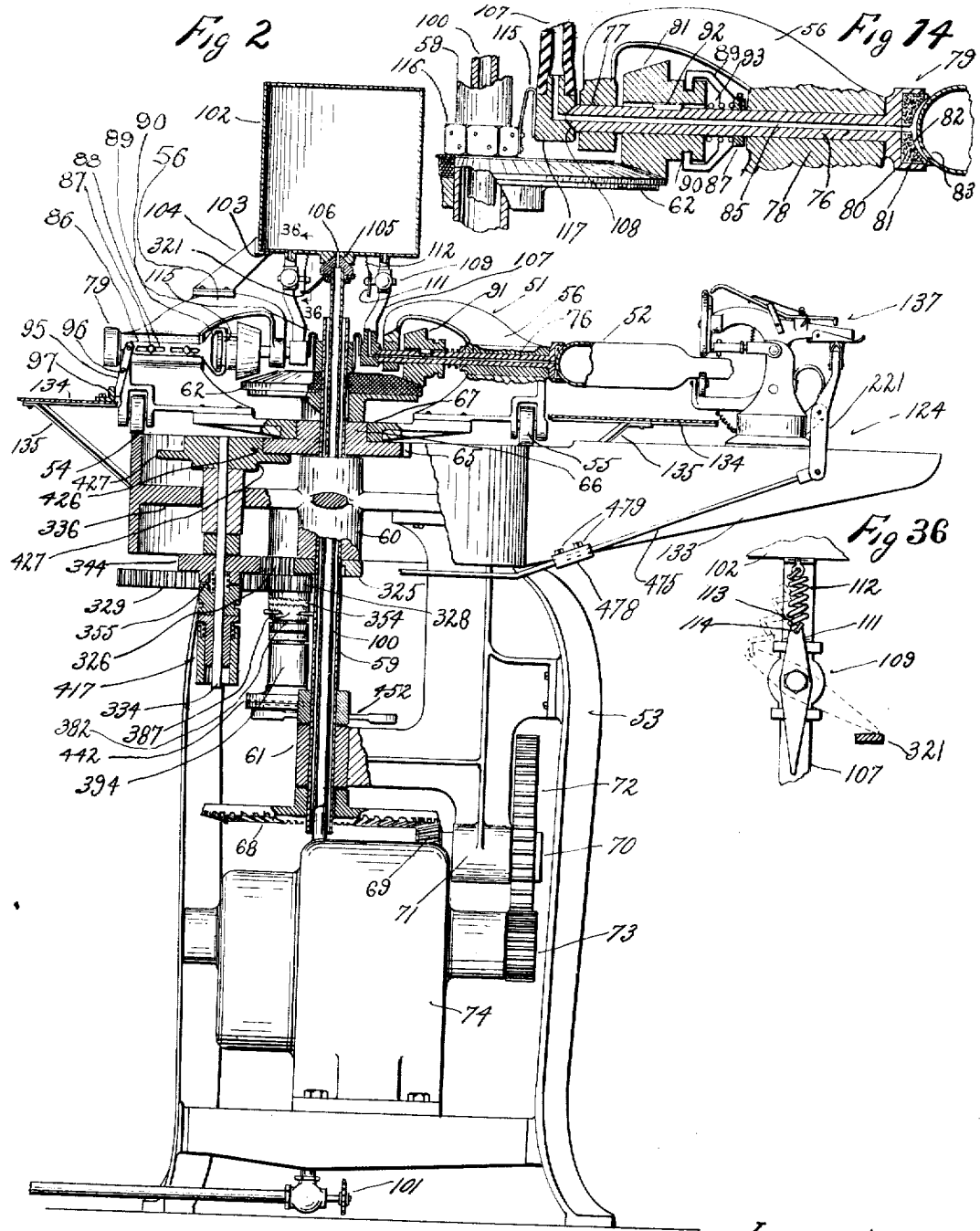

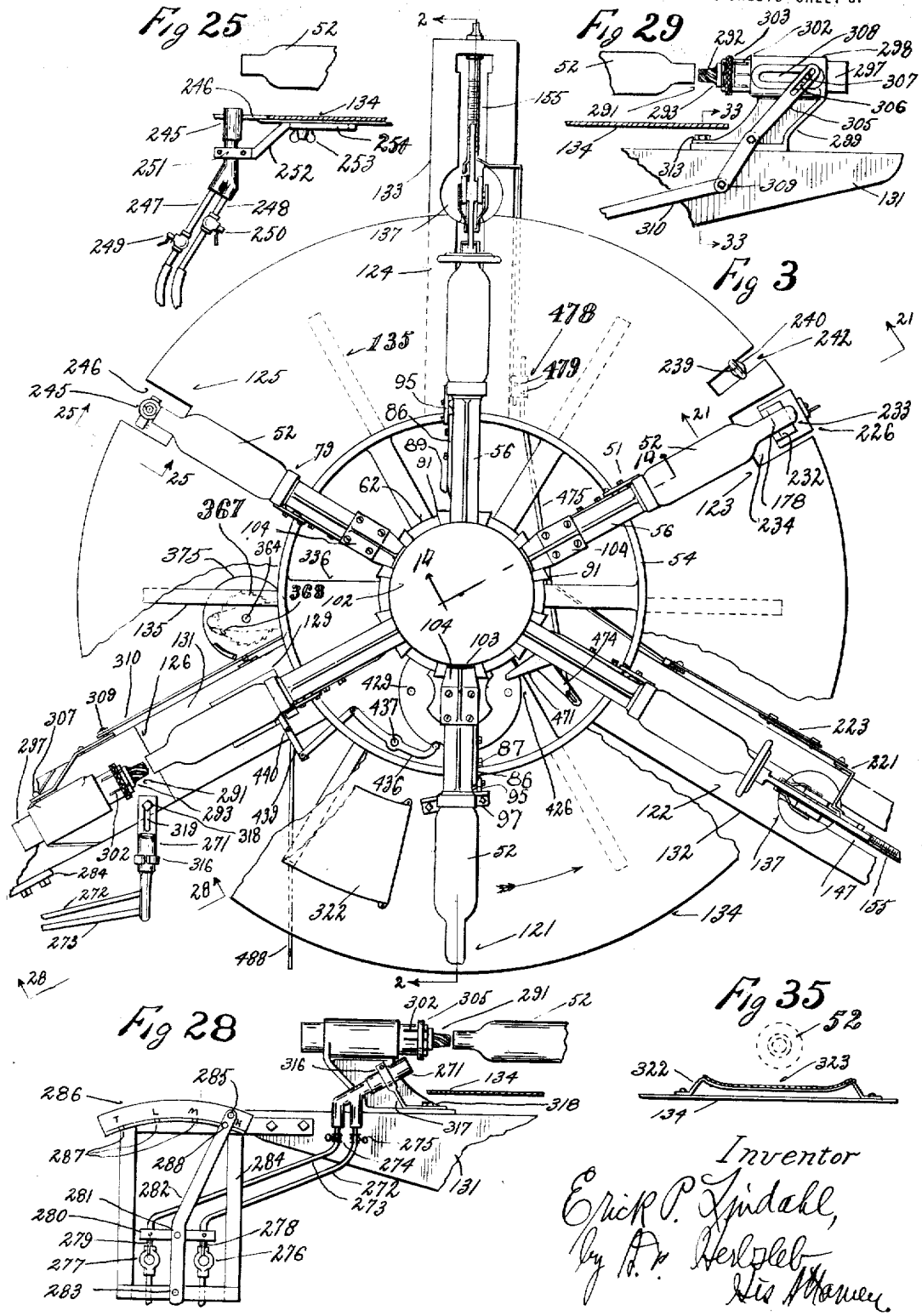

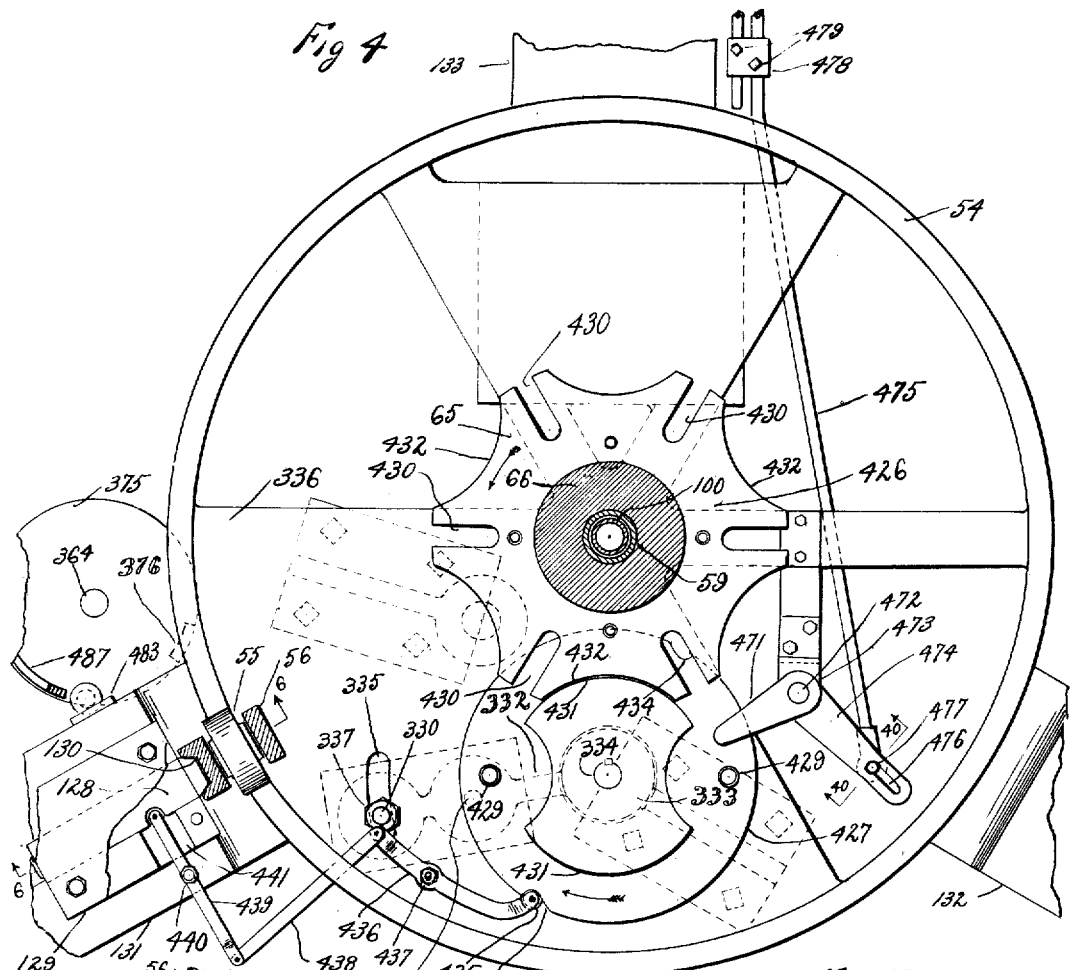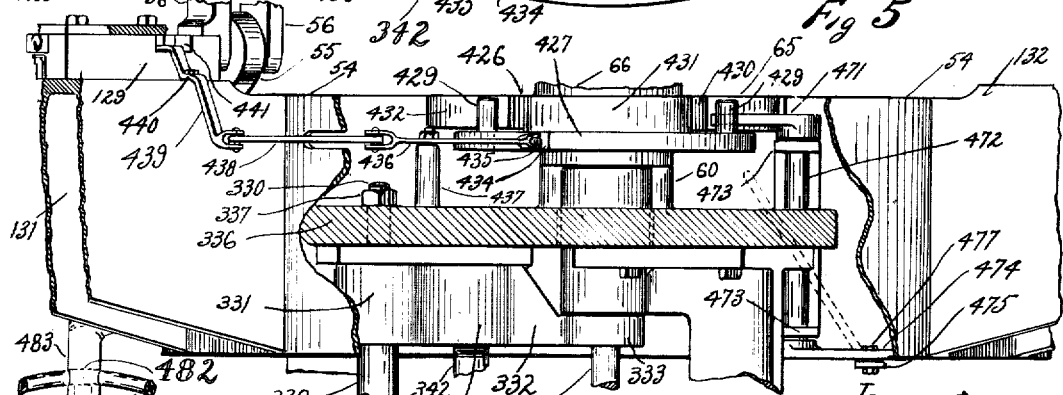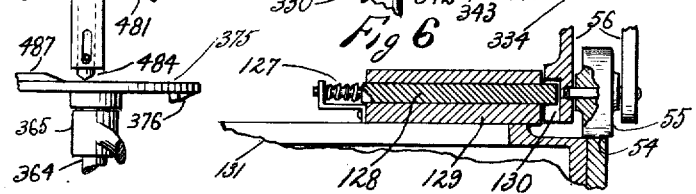

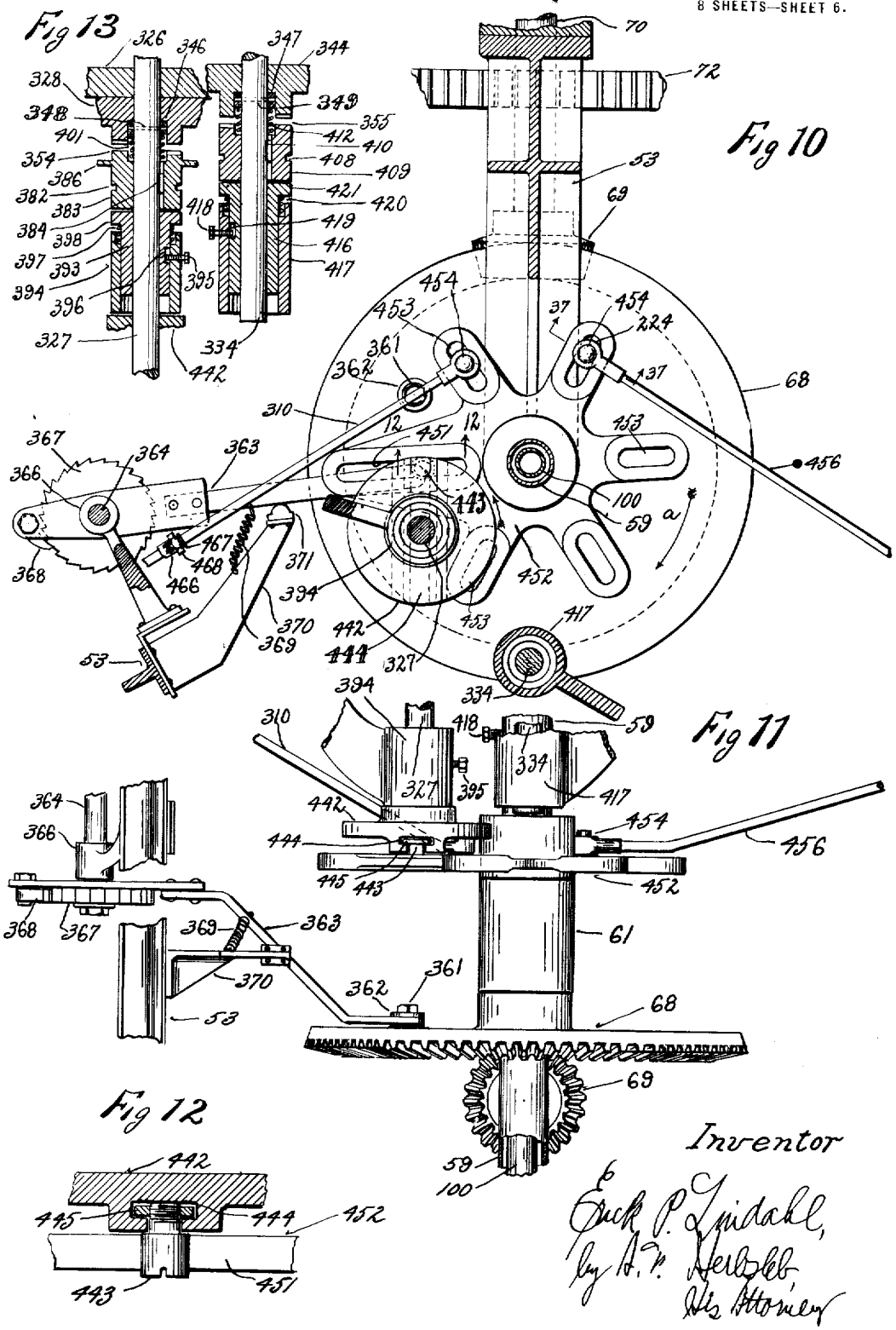

E. P. LINDAHL.
METHOD OF AND APPARATUS FOR MANUFACTURING GLASSWARE.
APPLICATION FILED SEPT. 7, 1918.
1,338,941.
Patented May 4, 1920.
8 SHEETS—SHEET 7.
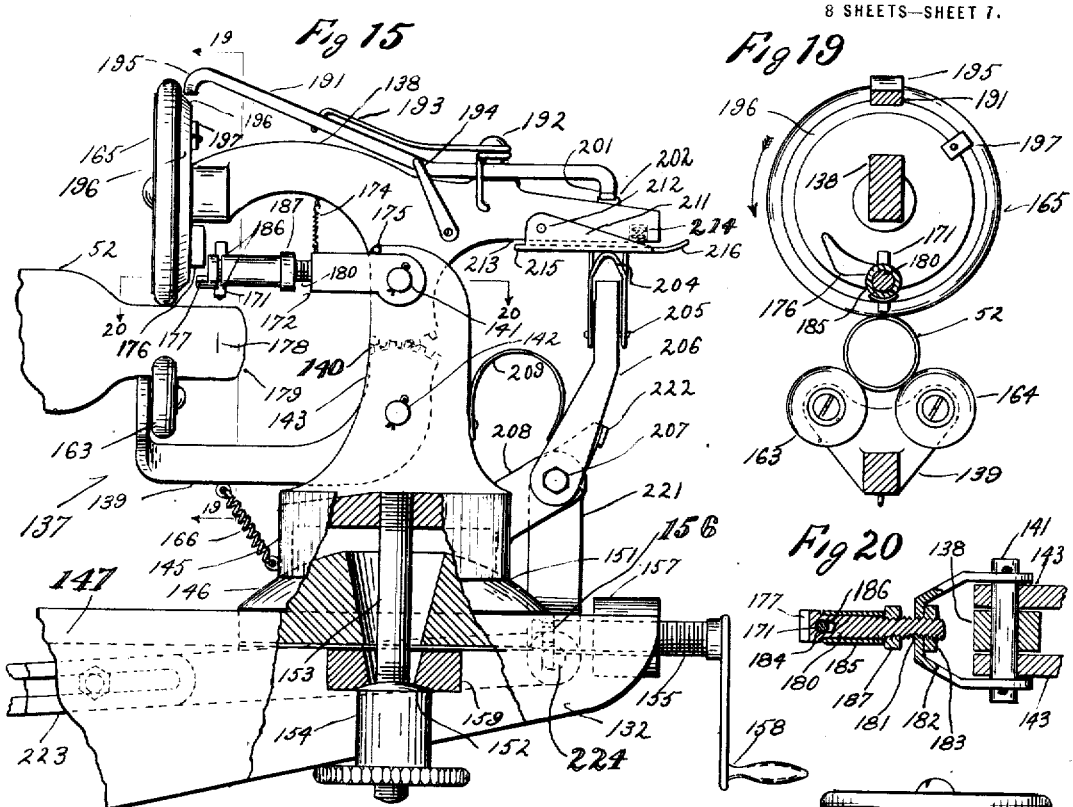

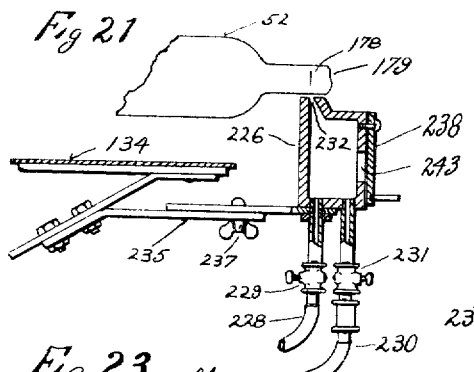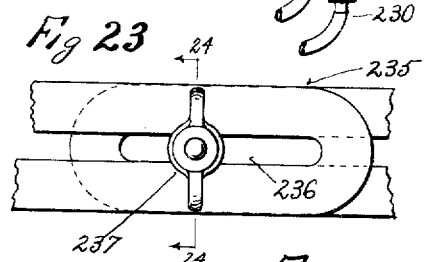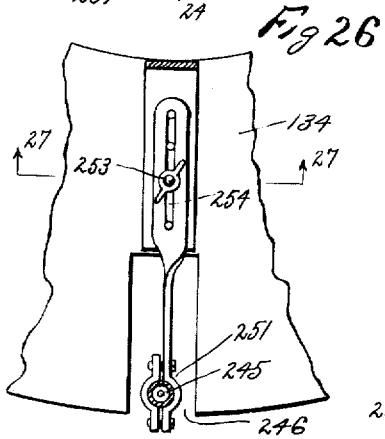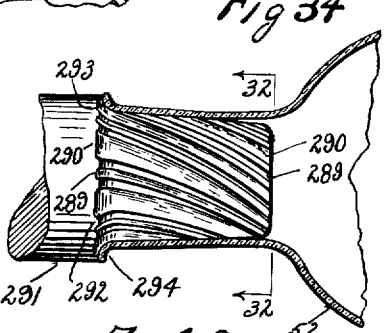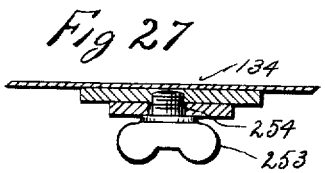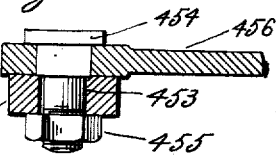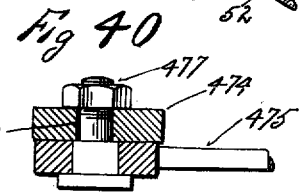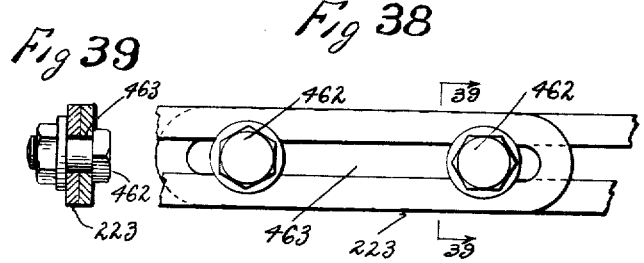

UNITED STATES PATENT OFFICE.

ERICK P. LINDAHL, OF CINCINNATI, OHIO, ASSIGNOR TO THE ICY-HOT BOTTLE COMPANY, OF CINCINNATI, OHIO, A CORPORATION OF WEST VIRGINIA.

METHOD OF AND APPARATUS FOR MANUFACTURING GLASSWARE.

1,338,941.    Specification of Letters Patent.    Patented May 4, 1920.

Application filed September 7, 1918. Serial No. 253,106.

*To all whom it may concern:*

Be it known that I, ERICK P. LINDAHL, a citizen of the United States, residing at Pleasant Ridge, in the city of Cincinnati, in the county of Hamilton and State of Ohio, have invented certain new and useful Improvements in Methods of and Apparatus for Manufacturing Glassware, of which the following is a specification.

My invention is applicable for use in connection with vacuum insulated containers, such as double walled vacuum bottles or receptacles, for instance as shown and described in Letters Patent No. 900,075 and No. 1,218,036, granted George P. Altenberg, respectively October 6, 1908 and March 6, 1917.

Vacuum receptacles as usually constructed, comprise an inner member and an outer member connected at the mouth by means of a cross-seal, the members being made of fusible frangible material, as glass, the joint or seal between the members being formed by fusing the materials of the two members together.

The blanks of the inner and outer members are usually formed with contracted necks. The mouth ends of the necks are trimmed to proper lengths and for forming an edge adaptable for sealing. The blanks of the inner and outer members are also normally formed with rounded bottoms, the bottom of the outer member being removed by trimming to permit the telescoping of the inner member within the outer member, a bottom of the outer member being then formed around the bottom of the inner member.

It is the object of my invention to perform the trimming operation in novel manner; further, to provide novel means whereby the surplus end portion of the blank of a member is trimmed from the body of the blank; further, to provide novel means for forming the mouth-end of a member; further, to provide novel means for rotating the blank; further, to provide novel means for holding the blank to its rotating part; further, to provide novel means for centering the blank; further, to provide novel adjusting means for the latter; further, to provide novel means for automatically moving said centering means into centering position; further, to provide the centering means with novel tripping means; further, to provide novel means for imparting intermittent planetary movements and rotations to the blanks and for automatically forming the mouth-ends of the members; and, further, to provide novel means for sequential intermittent planetary movements and rotations of the blanks and intermittent action thereon by the trimming and forming devices.

It is the object of my invention, further, to provide novel means for preparing the members for the sealing operation, whereby the sealing is simplified and more uniform mouths and necks for the vessels are obtained.

It is the object of my invention, further, to provide novel means for trimming the mouth-end of the member and flanging said mouth-end; further, to so relatively position the blanks and the trimming means that the trimmed members are of uniform lengths; and, further, to effect the trimming by scoring and heating; and the invention will be further readily understood from the following description and claims, and from the drawings.

I have, in the drawings, exemplified my invention as employed in trimming and forming the mouth-end of an inner member of a vacuum bottle or filler.

In the drawings:

Figure 1 is a front elevation of an exemplifying machine embodying my invention, the same being partly broken away.

Fig. 2 is a side elevation of the same, partly in vertical section on the line 2—2 of Fig. 3.

Fig. 3 is a plan view of the same, partly broken away.

Fig. 4 is a horizontal cross-section of the same taken on the line 4—4 of Fig. 1, showing the means for rotating the carrier.

Fig. 5 is a front elevation of the same, partly broken away.

Fig. 6 is a detail in section, taken on the line 6—6 of Fig. 4.

Fig. 7 is a horizontal cross-section, taken on the line 7—7 of Fig. 1, showing the gearing for intermittent rotation of the carrier and for reciprocating the trimming and forming devices.

Fig. 8 is a front elevation of the same.

Fig. 9 is an inside side elevation, partly in section on the line 9—9 of Fig. 7, but in an advanced position, showing the means for controlling one of the heating devices.

Fig. 10 is a horizontal cross-section, taken on the line 10—10 of Fig. 1, showing the means for reciprocating the trimming and forming devices, and the means for controlling the intermittently acting clutches.

Fig. 11 is a front elevation of the same.

Fig. 12 is a detail of the same in section on the line 12—12 of Fig. 10.

Fig. 13 is a detail of said clutch mechanism taken on the line 13—13 of Fig. 7.

Fig. 14 (Sheet 2) is an enlarged vertical section, taken on the line 14—14 of Fig. 3, showing the valve mechanism of the blank holding means.

Fig. 15 is a side elevation of the trimming mechanism, partly in axial section.

Fig. 16 is an outer end elevation of the same.

Fig. 17 is an inner end elevation of the same.

Fig. 18 is a plan view of the same.

Fig. 19 is a cross-section of the same, taken on the line 19—19 of Fig. 15.

Fig. 20 is a detail in cross-section taken on a portion of the line 20—20 of Fig. 15.

Fig. 21 is a detail of the severing burner taken on the section line 21—21 of Fig. 3.

Fig. 22 is an end elevation of the same.

Fig. 23 is a bottom view of the adjusting valves for the same.

Fig. 24 is a detail of the same in cross-section on the line 24—24 of Fig. 23.

Fig. 25 (Sheet 3) is a side elevation of the pre-heating means, partly in section on the line 25—25 of Fig. 3.

Fig. 26 (Sheet 8) is a bottom view detail of the same.

Fig. 27 is a cross-sectional detail of the same on the line 27—27 of Fig. 26.

Fig. 28 (Sheet 3) is a front side elevation of the forming means, taken in the direction of the arrow 28 in Fig. 3.

Fig. 29 is a rear side elevation of the same.

Fig. 30 (Sheet 1) is an outer end elevation of the same.

Fig. 31 is an axial section of the same taken on the line 31—31 of Fig. 30.

Fig. 32 (Sheet 8) is a cross-section of the same taken on the line 32—32 of Fig. 34.

Fig. 33 is a cross-section of the same taken on the line 33—33 of Fig. 29.

Fig. 34 is an enlarged detail showing the manner of forming the flange by means of the forming tool, the blank being shown in axial section.

Fig. 35 (Sheet 3) is a detail in front elevation showing the dropping table.

Fig. 36 (Sheet 2) is a detail in section taken on the line 36—36 of Fig. 2, showing the means for operating the valve of the vacuum chuck.

Fig. 37 (Sheet 8) is a detail in cross-section of the adjustment for the link-pin, taken on the line 37—37 of Fig. 10.

Fig. 38 is a detail in rear side elevation of the link adjustment for the operating devices at the first operating station.

Fig. 39 is a cross-section of the same taken on the line 39—39 of Fig. 38; and

Fig. 40 is a cross-sectional detail of the link-articulation with the bell-crank lever, taken on the section-line 40—40 of Fig. 4.

A carrier 51 is arranged to be rotated, and to carry blanks 52, represented as blanks of inner members for double-walled vacuum bottles, also called fillers, planetwise in an orbit. Means are provided to cause cessation of rotation of the carrier at intervals, so as to position the blanks at stations for having various operations performed thereon. In the present exemplification the blanks are arranged to rotate while positioned at their stations and while moving in their orbital paths.

The main frame 53 is provided with a circular track 54 on which wheels 55 ride, the wheels being journaled on the carrier, as in brackets 56 of the latter.

A drive-shaft 59 is journaled in bearings 60, 61, of the main frame, (see Figs. 2 and 14), and has a gear 62 fixed thereto, this gear being exemplified as a friction gear. A gear 65 is supported by the bearing 60, the drive-shaft rotating loosely therein. The gear 65 has a hub 66 which is received in a bearing 67 of the rotary carrier to center the rotary carrier about the drive-shaft. The gear 65 is exemplified as the star-wheel of a Geneva movement. (See Fig. 4.)

The drive-shaft is arranged to be suitably driven as by means of a bevel-gear 68, (see Figs. 1 and 2), which is meshed by a bevel-pinion 69 on a shaft 70 journaled in a bearing 71 of a main frame. The shaft 70 has a gear 72 thereon, which is meshed by a pinion 73 on the armature-shaft of an electric motor 74.

A shaft 76 is mounted in each of the brackets 56, as by being journaled in bearings 77, 78, therein, (see Figs. 1, 2, 3 and 14), each of these shafts being provided with a holding means 79 for a blank, the carrier being arranged to simultaneously support as many blanks as there are brackets. The holding means is exemplified as a vacuum chuck, comprising a cup 80 in which there is a seat 81 for the blank, this seat preferably being of cushion material, for instance, leather or rubber, and having a concave recess 82 in which the rounded bottom 83 of the blank is arranged to be received, the recess in the seat being preferably deeper than the portion of the blank received therein, so that the wall of the recess may throughout its annular outer edge have close contact made therewith by the blank.

The shaft 76 has a bore 85 therethrough, the bore extending through the seat and communicating with the recess therein. (See Fig. 14.) Endwise movement of the shaft 76 is avoided by positioning said shaft lengthwise by means of the cup 80 and a collar 87 fixed to said shaft, the cup and collar being seated against opposite ends of the bearings 78.

A pinion 91 is arranged to rotate the shaft 76, and is represented as a friction pinion having spline-connection 92 with said shaft and urged toward the friction-gear 62 by means of a spring 93 encircling the shaft, the spring being located between said gear 91 and the collar 87 about the shaft.

A rod 86 is slidable on each of the brackets 56 by having screws 87 threaded in the bracket pass through slots 88 in the rod. A fork 89 on the rod is received in an annular groove 90 in the hub of the friction pinion 91. A lever 95 is pivoted at 96 to the bracket. A fixed cam 97 at the operator's position engages the lever for moving the friction pinion away from the friction gear, thereby permitting the shaft 76 to cease rotation while the blank is being inserted into the chuck.

The drive-shaft 59 is preferably a hollow shaft for receiving a pipe 100 therethrough. (See Fig. 2. This pipe has a regulating valve 101 therein and leads from a suitable source of suction or vacuum, as from a suitable vacuum pump, not shown, and communicates with a tank 102 instanced as a vacuum tank. (See Figs. 1, 2 and 3). The tank is supported by bearings 103 on branches 104 extending from the brackets 56, three of these branches being shown. There is relative rotation between the carrier and the pipe 100, for permitting which a rotary joint 105 is located between the pipe 100 and the interior of the tank, there being a passage 106 through said joint.

A feed pipe 107 extends from each of the shafts 76, preferably by means of a rotary joint 108, (see Figs. 2 and 14), the feed-pipe 107 being shown as a flexible pipe, for instance of substantially impervious rubber, and is connected with a valve 109 having communication with the interior of the tank. The valves 109 are provided with handles 111, springs 112 normally moving said handles into position so that the valves 109 are open. (See Fig. 36, Sheet 2). One end of each of the springs is detached to the tank, the other end being received through a hole 113 in the handle. The handle may be given a quarter-turn, and be frictionally held, to hold the valve closed when it is desired to manually close the valve.

The communications between the tank 102 and the vacuum chuck 79, are normally open during the operation of the machine. A blank is normally seated in each of the chucks, except when the blanks are changed at the operator's position, in manner as hereinafter described.

The tank is provided so as to have a comparatively large supply of vacuum closely adjacent to the various chucks, so that in case of breakage of the blank or other accident, which would open communication from the seat 81 to the atmosphere, the supply of vacuum will still be sufficient to hold the other blanks in place until the operator is enabled to manually turn the valve 109 communicating with the particular seat thus released and turn the handle thereof to sufficient extent to prevent automatic return of the handle by means of the spring 112.

The rotary joint 108 preferably comprises a conical plug and recess therefor. (See Figs. 2 and 14). For normally urging contact of the conical faces, springs 15, shown as leaf springs, are located between a polygonal collar 116, in which the shaft 59 rotates, and the respective movable members 117 of the rotary joints 108, the springs being shown secured to the faces of said polygonal collar and bearing against said movable members.

The rotary joint 105 is exemplified as comprising a conically faced plug and seat, the weight of the tank resting on the joint, the bearings 103 aiding in centering the tank and preventing tipping thereof.

In the present exemplification of my invention, there are six positions of rest or stations for the carrier. (See Fig. 3). These are the operator's station 121, the blank centering station 122, the severing station 123, the blank centering station 124, the blank preliminary heating station 125, and the blank flanging station 126. Blank trimming means may also be located at either or both of the blank centering stations 122, 124.

As hereinbefore stated, intermittent rotation is imparted to the carrier and the blanks are rotated, the blanks being carried by means of the carrier planetwise in an orbit to position the blanks at the various operating stations.

The friction-gear 62 rotates continuously for rotating the friction pinions 91. When the carrier is stationarily positioned, all of the movement transmitted by the friction-gear 62 is converted into rotary movement of the friction pinions. When the carrier is released, the friction pinions also have a rolling motion over the friction-gear.

The carrier is held in positions of rest by means of a lock comprising a bolt 128 urged into locking position by a spring 127. (See Figs. 1, 3, 4 and 6). The bolt is arranged to reciprocate in a bearing-block 129, the bolt coacting with a recess 130 in each of the brackets 56. The bearing-block is fixed to a bracket 131 extending from the machine frame. Three of these brackets are shown at 131, 132, 133, respectively. Means are provided for automatically reciprocating the bolt, to be hereinafter described.

A table 134 is located above the brackets on the frame outside the path of the rollers on the carrier. It is supported by braces 135 between the table and frame. (See Figs. 1, 2 and 3).

The blank to be operated on is attached to the carrier at the operator's station 121, the previous finished blank having been released. The operator merely presses the bottom of the blank into the chuck 79, whereby the periphery of the seat makes contact with the blank, vacuum or suction communicating therewith through the bore 85, for holding the blank in place and in radially extending relation to the carrier. The release of the carrier taking place, the blank just inserted moves to the position 122, whereupon rotation of the carrier again ceases for having the blank operated on at said station.

When the planetary movement of the blank ceases, it is acted on by a centering device 137, this centering device being exemplified as comprising a pair of jaws 138, 139, having toothed segments 140 between them. (See Figs. 1, 2 and 15 to 20 inclusive). The jaws are pivoted on shafts 141, 142, between uprights 143, of a stand 145, the stand having swiveling connection with a slide 146, slidable radially with relation to the carrier on a guideway 147 of the bracket 132 on the main frame. The swiveling connection between the stand and the slide is shown as consisting of a ball and socket joint 151, 152, a clamp-screw 153 and a clamp-nut 154 clamping the parts in adjusted positions.

The slide 146 is adjustable on the bracket by means of an adjusting screw 155 having journal connection 156 with the slide so as to be held endwise thereto, and threaded connection with a threaded bearing 157 on the bracket, a handle 158 being provided for rotating the adjusting screw. The clamp comprises a clamp-bar 159 which is received under the guideway for clamping the slide to the bracket, and clamping the stand to the slide.

The jaw 139 has rollers 163, 164, journaled thereon, and the jaw 138 has a roller 165 journaled thereon, these rollers preferably having cushioned peripheries, for instance peripheries of rubber, to prevent injury to the blank. The jaws are normally separated by a spring 166, one end of which is secured to one of the jaws and the other end of which is secured to the stand. When the blank arrives at station 122, the roller ends of the jaws are caused to approach each other, whereby contact is made with the blank by the rollers, for centering the outer end of the blank concentrically with the axis of rotation of the chuck holding the same. The inner end of the blank is held to the carrier by the suction chuck 79. The vacuum connection with the blank at the chuck maintains the blank in radially extended relation, but permits shifting between the blank and the chuck by the positively positioning action on the outer end of the blank.

The adjustment of the slide 146 on the bracket 132 by means of the adjusting screw 155 locates the slide for a longer or shorter blank, and the adjustment of the stand 145 in the slide adjusts the jaws so as to position the axis of the mouth-end of the blank coincident with the axis of rotation of the chuck.

The blank may also be acted on at this station by a cutting or scoring tool, exemplified as a diamond secured to a stem 171, which is secured to an arm 172 pivoted by a pin 141 to the stand, a spring 174 normally raising the arm against a stop 175 and holding the tool out of operative connection with the blank. The tool is caused to contact the blank during rotation of the blank, which contact is preferably momentary. The contact is caused, in the present exemplification, by a cam-lug 176 on the roller 165, which contacts a shoulder 177 on the arm 172. A cut or score 178 is thereby provided in the blank for determining the cracking off line for the refuse-end 179 of the blank.

The position of the tool lengthwise of the blank is adjustable by providing a screw-threaded shank 180 which is threaded in a threaded bearing 181 of a yoke 182 forming part of the arm 172, a jam-nut 183 holding the parts in adjusted positions.

The shank is provided with a slot 184 through which the stem 171 of the tool is received, a sleeve 185 being received about the shank, the end of the sleeve having arc recesses 186 therein at its respective sides, in which the stem is received, the stem being forced toward one end of the slot 184 by means of a nut 187. By these means the tool may be adjusted axially with relation to the blank, for determining the length of the neck of the blank when trimmed, and may also be adjusted toward and from the axis of rotation of the blank to adjust the tool to the diameter of the neck.

Means are provided for tripping the jaws 138, 139, when the proper function has been performed on the blank. This is accomplished by a lever 191 pivoted to jaw 138 by a screw 192. A spring 193 normally positions the lever against a stop 194 on said jaw. This stop is a spring stop. The lever 191 has a finger 195 thereon, which is urged toward the annular face 196 of the roller 165 by the spring 193. There is a lug 197 on said face. When this lug in the rotation of the roller, arrives at the position of the finger 195, it strikes said finger, whereby the lug causes swinging of the lever on its pivot against the resistance of the spring stop 194. The other end of the lever is provided with a finger 201, which contacts a detent 202 pivoted at 203 to a keeper 204 pivoted at 205 to an arm 206 pivoted at 207 to a bracket 208 of the stand. The axes of the pivots 203, 207, are at right angles to each other. A spring 209 normally urges outward movement of the arm 206.

The keeper coacts with a wiper 211 pivoted at 212 to the tail 213 of the jaw 138, a spring 214 normally urging downward movement of the outer end of the wiper, which downward movement is limited by contact of a lug 215 thereon with said tail. The outer end of the wiper has an inclined face 216.

When now the finger 195 is contacted by the lug 197, the latter swings the lever 191 on its pivot for causing the finger 201 to move the detent 202 to the right, as shown in Fig. 16, the spring-stop 194 returning the lever to normal position, for releasing the keeper 204 from the wiper 211, the detent being so mounted that its contact-face is normally in range with the finger 201, the contact end of the detent, however, being arranged to be depressed on movement of the finger 201 thereover in opposite direction. The movement of the detent 202 causes the keeper 204 to be released from the wiper 211, whereby the spring 166 causes opening of the jaws, so that the blank may again move in its orbit past the rollers thereon.

Relative approach between the rollers on the jaws is accomplished by means of a lever 221 pivoted on the pivot 207 and having a lug 222 thereon which engages the arm 206. The lever 221 is operated by a link 223 having articulation 224 therewith, the link being arranged to have timed reciprocation imparted thereto by means hereinafter described.

The blank is next caused to move in its orbital path into its next rest position at the station 123. The blank is caused to rotate at this station while subjected to a line of heat extending across the blank and confined in direction lengthwise of the blank substantially to the line of scoring or cutting caused by the scoring or cutting tool. (See Fig. 3 and Figs. 21, 22, 23 and 24, Sheet 8.)

This heating means comprises a heating chest 226 in which there is a flame, fed, for instance, by gas from a pipe 228 in which there is a regulating valve 229 and a compressed air-pipe 230 in which there is a regulating valve 231. The portions of the pipes under the valves are flexible. A slit 232 in the heating chest extends crosswise of the blank, under the position of and in line with the scoring or cut made by the cutting tool, a high heat being projected through the slit. The heating of the blank in this manner causes a tension on the material of the blank in a line around the blank located in a plane at right angles to its axis of rotation, whereby a fracture along a straight line around the blank is caused in the blank for causing the outer end 179 of the blank to break away and leave a trimmed edge on the blank.

The heating chest is adjustable toward and from the axis of rotation of the carrier to accommodate blanks of different lengths, an opening 234 in the table permitting the adjustment, as by being mounted on an arm 235 comprising a plurality of sections having slots 236 therein, a clamp-screw and nut 237 extending through the slots clamping the sections of the arm together in adjusted relation. (See Figs. 23 and 24.) A shutter 238 normally closes the observation opening 243.

To aid in cracking off or severing the outer end of the blank, the blank next advances over a cooling device, exemplified as a slit 239 in a pipe 240 which branches from the pipe 230 and has a valve 241 therein. The slit extends crosswise of the blank and is located the same distance from the axis of rotation of the carrier as the distance at which the slit 232 is located from said axis. (See Figs. 3 and 22.) The pipe extends through an opening 242 in the table and is adjustable with the heating chest. The blank is rotating while passing over the slit 239, and during the passage thereover is subjected to a blast of chilling air passing through the slit.

The blank next advances to the station 124 at which there is a duplicate of the centering device and scoring device hereinbefore described for acting on the blank in manner similar to the action thereon at the station 122, the scoring device at station 124 being provided for additional assurance that the trimming of the blank shall take place in case the blank may have moved from its position at station 123 to the station 124 without severance of its outer end taking place. In this event the blank arrives at the station 124 with the line of its position of scoring in heated condition, so that contact of the cutting tool at the position 124 insures severance of the outer end of the blank and trimming of the blank.

If desired, the cutting or scoring tool may be omitted at the station 122 and this station employed merely as a blank-centering station, the blank being first heated in the line of its intended scoring at the station 123 prior to application of the scoring tool at the station 124.

The blank next advances to the station 125, where the outer end of the blank is again subjected to heat, so as to positively cause the severance of the outer or refuse-end of the blank and trimming of the blank along the line of scoring, if per chance this trimming shall not have previously taken place, owing to rapidity of operation.

The heat at station 125 is furnished by a burner 245, which projects a flame upon the outer trimmed end of the blank, the flame being distributed over said end, for annealing the mouth-end of the blank preparatory to receiving the intense heat at station 126. The burner is located under the outer end of the blank in a recess 246 in the table and is fed by a gas pipe 247 and a compressed air pipe 248 respectively having valves 249, 250, therein. (See Figs. 3, 25, Sheet 3, and Figs. 26, 27, Sheet 8.) The burner is clamped by a clamp 251 to a hanger 252 adjustable toward and from the axis of rotation of the carrier, as by having a clamp-bolt 253 pass through a slot 254 in the hanger for clamping the burner 245 in adjusted positions for accommodating blanks of different lengths. The portions of the pipes below the valves are flexible for permitting such adjustments.

The blank is next advanced to the station 126, at which the outer end of the blank, namely the mouth-end in the present exemplification, is subjected to intense heat of a burner 271 with which a gas pipe 272 and a compressed air pipe 273 connects, gas and air suitably mixing in the burner for causing a flame having high heating properties. The pipes have valves 274, 275, therein, respectively. This flame is projected diagonally across the outer edge of the blank, as shown in Figs. 1 and 3, so that the entire circumference of the trimmed outer edge is simultaneously subjected to this heat by a slanting flame. Valves 276, 277, are in the pipes 272, 273, and have handles 278, 279, projecting therefrom, (see Fig. 28, Sheet 3), the handles being articulated with a cross-bar 280 which is articulated at 281 with a lever 282 pivoted at 283 to a bracket frame 284 supported from the bracket 131 at said station. The sections of pipes 272, 273, between the two sets of valves are flexible to permit adjustment of the burner.

The glass of different blanks, in practice, has different thicknesses, some of the blanks being thin, others light, others medium, and others heavy. It is desirable that the degree of heat applied to blanks of different weights at their mouth-ends, shall be different, dependent on the weight of the glass. I have for this purpose provided ready means for regulating the heat, convenient to the operator in his position.

The lever 282 is provided with a handle 285. A gage 286 is provided having markings thereon, for instance, "T," "L," "M," "H," to indicate respectively, thin, light, medium and heavy blanks, there being a notch 287 in association with each of these graduations on a scale, so that a lug 288 on the lever may be received therein for holding the lever in adjusted position, according to the adjustment made thereof by the operator for adjusting the intensity of the flame at the station 126. The object of this regulation is to impart the proper intensity of heat to the mouth of the glass blank or member of the vacuum bottle, so that this mouth-end or edge will be in proper plastic condition for being acted on by a flanging tool when the flanging tool coacts with the blank automatically, in the course of operation of the machine.

Such a flanging tool is shown at 291 and consists preferably of a round rod or block of carbon having shaping ribs 292 thereon, the tool tapering toward its entering end for shaping the mouth portion of the neck of the blanks, so that all the mouth portions of the various bottles shall be alike for the reception of a proper stopper. (See Figs. 1, 3, 31, Sheet 1, and 34, Sheet 8.) The base portion of the ribs on the block has a radially flaring portion 293 for shaping the outer edge of the mouth into the form of a flange 294.

The ribs are preferably arranged spirally on the tool and separated by spiral grooves 290, the peripheral faces of the ribs being provided with shallower grooves 289, so that friction between the tool and plastic mouth-end of the blank is minimized.

The blanks have, prior to operation thereon of the flanging tool, been trimmed to equal lengths, and the distance of movement of the flanging tool is the same for the various blanks, so that blanks of uniform shapes and sizes of flanges are insured, providing economy and accuracy in subsequent steps in the making of the double-walled vessels. The flanging takes place preferably in the presence of heat directed upon the end of the blank to be flanged, the heat also maintaining the tool at desired temperature to prevent chilling of the glass on account of having the tool too cool and to prevent adhesion of the glass thereto on account of the tool being too hot.

The flanging tool is suitably secured to a slide 297, which is slidable lengthwise in a bearing 298 in a stand 299 adjustably secured to the bracket 131. The slide is shown as a tube whose inner end is provided with a tapered threaded portion 301 having end-slots 302 therein, a nut 303 received over said threaded portion clamping the tool in the tube.

A lever 305 is pivoted to the stand 299 and is provided with a slot 306 in which a pin 307 is received, (see Figs. 1, 29, Sheet 3, 30 and 31, Sheet 1), the pin being fixed to the slide 297 and projecting through the side of the bearing 298 through a slot 308. The lever 305 is articulated at 309 with a link 310 reciprocated in manner hereinafter described.

The stand 299 is adjustable on the bracket 131 by being slidable lengthwise thereof toward and from the axis of rotation of the carrier. A clamp-bolt 313 passes through a clamp-bar 314 having a lug 312 slidable in a slot 315 in the bracket and is threaded into a clamp-nut 320, the stand, plate and bolt being adjustable lengthwise of the slot. (See Fig. 33, Sheet 8.) The burner 271 is secured in a clamp 316 on an arm 317 adjustable on the stand, and clamped in adjusted positions by means of a clamp-bolt 318 passing through a slot 319 in the arm and threaded in the stand. (See Fig. 3.)

When the flanging tool has been operated and the flange formed on the blank, the blank leaves the flanging station and moves in its orbit toward the station at the operator's position. Just prior to its arrival at the operator's position, the valve 109 in the vacuum pipe 107 communicating with the vacuum chuck 79, is automatically closed by means of a finger 321, which is fixed to the pipe 100 and projects into the path of the handle 111 of said valve for momentarily closing the valve, (see Figs. 2 and 36, Sheet 2), whereby the vacuum is shut off from the vacuum chuck 79 and the blank released from said chuck, the blank at the time of release being just over a shelf 322 on which it is received. The shelf is supported on the table. The shelf may be properly cushioned by a cushion 323 to prevent injury to the blank, although in practice the operator takes hold of the blank before its automatic release with one hand, and has another blank in his other hand ready to be inserted into the chuck as soon as the chuck arrives at the operator's station 121. The closing of the valve is only momentary, the handle 111 passing the finger 321, the spring 112 returning the finger to normal position and opening the valve by the time the operator inserts the fresh bottle into the chuck.

The means for causing automatic movements of the operating devices and timed intermittent rotations of the carrier are exemplified as comprising the following mechanisms, namely:

The drive-shaft 59 has a gear 325 fast thereon. The gear 325 meshes with a gear 326 rotating loosely about a shaft 327. The gear 326 has a gear 328 fast therewith. (See Figs. 1, 3 and 7.) The gear 328 meshes with a gear 329. The gear 329 rotates loosely about a stud-shaft 330 which is held in a bearing 331 of a segment-arm 332 having a bearing 333 about a shaft 334. (See Figs. 1, 5 and 7.) The stud-shaft 330 is fixed in adjusted positions in an arch-slot 335 in a plate 336 of the machine frame, by means of a clamp-nut 337. The adjustment of the segment-arm and stud-shaft permits gears 329 of different diameters to be employed for varying the speed of operation of the parts driven thereby. A pinion 339 is fast with the gear 329. The gears 329, 339, are held to the stud-shaft by a collar 340. The pinion 339 meshes with a gear 341 loose on a stud-shaft 342 fixed in a bearing 343 of the segment-arm. The gear 341 meshes with a gear 344 rotating loosely about the shaft 334.

The gears 328 and 344 are held in endwise positions toward the segment-arm 332 on their respective shafts by means of collars 346, 347, held in place by pins 348, 349. (See Fig. 13.)

Clutches 354, 355, (see Figs. 1, 2, 8 and 13), connect said gears 328 and 344 with their respective shafts. When the clutch 354 is in engagement, the shaft 327 is rotated for causing actuation of the operating tools at stations 122 and 126. When the clutch 355 is in engagement, the shaft 334 is rotated for causing actuation of the operating devices at station 124, followed by rotation of the rotary carrier, and obstruction of flow of fuel to the burner at the flanging tool.

The means for operating the clutches are as follows: Gear 68 has thereon a bolt 361 about which there is a roller 362 arranged to make contact with a lever 363 pivoted about a shaft 364 journaled in bearings 365, 366, supported by brackets extending from the main frame. (See Figs. 1, 3, 10 and 11.) A ratchet-wheel 367 is fast on the shaft 364, a ratchet-tooth 368 on the lever 363 being arranged to coact with the teeth of the ratchet-wheel.

The gear 68 rotates in the direction of the arrow $a$, Fig. 10, the lever being moved by the roller at each rotation of the gear, for advancing the ratchet-wheel one or more teeth, as may be desired. The lever is caused to return to normal position at each actuation, by means of a spring 369 extending between said lever and a bracket 370 extending from the main frame, on which there is furthermore a buffer 371 to cushion the return of the lever.

A disk 375 is fast with the shaft 364. (See Figs. 1, 4, 7 and 8.) It has a cam 376 thereon, which is arranged to contact a tappet 377 on a lever 378 pivoted to the main frame on a bolt 379, the lever comprising a fork 380 having pins 381 thereon received in an annular slot 382 of a sleeve 383 having spline-connection 384 with the shaft 327. (See Fig. 13.) The sleeve 383 is the movable member of the clutch 354.

The sleeve 383 has a flange 386 thereon provided with a recess 387 and a cam-face 388. (See Figs. 7 and 8.) When the clutch 354 is brought into engagement by axial movement of the sleeve 383, a single revolution of the shaft 327 is caused. In order to insure the stoppage of the shaft at the end of each revolution, the sleeve 383 is provided with a tooth 391 arranged to be received in a notch 392. The notch is on a bushing 393, (see Figs. 8 and 13), which preferably has possibility for slight reciprocation in a bearing 394 on a bracket extending from the main frame. Rotation of the bushing within the bearing is prevented by means of a positioning bolt 395 received in a slot 396 in the bushing, the bolt being in engagement with an end wall of the slot for determining the extent of movement of the bushing toward the sleeve. A spring 397 received about the bushing between the bearing and a rim 398 on the bushing, normally urges the bushing toward the sleeve and provides a yielding stop for the sleeve, the spring being sufficiently strong to maintain the bushing in stopping relation during normal operation of the machine, but permitting yield of the bushing to prevent breakage.

Separation of the clutch members is normally caused by a spring 401, (see Figs. 13), so that engagement of the clutch by the cam 376 is resisted by the spring, the cam 376 engaging the clutch so that rotation of the sleeve and the shaft 327 is initiated, the clutch being maintained in engagement by having the tooth 391 ride on top of the rim 398 until the tooth again arrives at the position of the notch 392, at which point the spring 401 forces the tooth into the notch for disengaging the clutch.

A lever 404 is pivoted at 405 to the main frame and comprises a fork 406 having pins 407 received in an annular slot 408 in a sleeve 409 having spline connection 410 with the shaft 334 for rotating said shaft when the clutch 355 is in engagement.

A tappet-end 411 of the lever is arranged to be engaged by the cam-face 388 for axially moving the sleeve 409 upon rotation of the sleeve 383, for engaging the clutch 355, a spring 412 acting to normally disengage the clutch. A bushing 416 is received about the shaft 334 in a bearing 417, a positioning bolt 418 received in a slot 419 in the bushing preventing rotation of the bushing and limiting its endwise movement toward the clutch by having the bolt engage one end of the wall of the slot.

The bushing is normally urged toward the sleeve 409 by means of a spring 420 received about the bushing between the bearing and a rim 421 on the bushing. The sleeve is provided with a tooth 422 arranged to be successively received in a plurality of notches 423 in the rim 421. The sleeve is provided with two of the teeth 422 and the bushing is provided with two of the notches 423 at diametrically opposite sides of the shaft 334, for permitting a half revolution of the shaft 334 at each engagement of the clutch 355. When the clutch is engaged, the teeth 422 ride on top of the rim 421 until the oppositely disposed notches are reached, whereupon the teeth are forced into the notches by means of the spring 412 for causing cessation of rotation of the shaft 334.

An intermittent operating device, represented generally by the numeral 426, and exemplified as a Geneva movement, is provided, for transmitting intermittent rotations from the shaft 334 to the intermittently rotating carrier, for insuring positive intermittent rotating movements and stoppages of the carrier. (See Figs. 1, 2, 4 and 5.)

The pin-disk 427 of the intermittent operating device is fixed to the shaft 334, and the star-wheel 65 thereof is fixed to the frame of the rotary carrier. In the present exemplification the pin-disk is provided with two actuating pins 429, and the star-wheel is provided with six coacting slots 430, there being six rest positions of the blanks and carrier, hub-sectors 431 of the pin-disk coacting with arc-recesses 432 in the star-wheel while the carrier is in its rest-positions.

The pin-disk is further provided with a pair of notches 434 in which a roller 435 on a lever 436 pivoted to the frame at 437 is received. (See also Fig. 3.) The lever has articulation by means of a link 438 with a lever 439, pivoted at 440 to the bracket 131, the operating end of the lever being received through a slot 441 in the bearing-block 129, for unlocking the carrier. As soon as rotation of the pin-disk is initiated, the lever 436 is moved for releasing the lock, after which rotation of the carrier is initiated, the lock being reëngaged when the rotation ceases.

The movable operating parts on the slides are caused to move prior to the beginning of rotation of the carrier, so that the operating parts perform their functions while the blanks rotate at their stations. Centering movement of the first of the centering devices acting on the blank and of the flanging tool, are shown as caused by means of the clutch 354 and shaft 327, and the centering movement of the centering device and actuation of the trimming tool, operating between the initial centering device and the flanging tool, are exemplified as caused by the rotation of the pin-disk.

The shaft 327 is provided with a crank-plate 442 provided with a crank-pin 443 adjustable in a slot 444 of the crank-plate, and held in adjusted positions by means of having the inner threaded end of the pin coact with a nut 445 in the slot for clamping the pin in adjusted positions. (See Figs. 1, 10, 11 and 12).

The crank-pin 443 coacts with the walls of a slot 451 in a rocker-plate 452. The rocker-plate rocks back and forth at each rotation of the shaft 327, the extent of rocking movement being adjusted by adjustment of the crank-pin. The rocker-plate rocks about the drive-shaft 59. It is provided with slots 453 in which articulating pins 454 are arranged to be adjustably clamped, as by nuts 455, so as to position the articulating pins at greater or less distance from the rocking axis of the rocker-plate. (See Figs. 10, 11 and 37). Links 456, 310, have articulations with the respective articulating pins.

The link 456 is articulated at 457 with a lever 458 pivoted at 459 to the bracket 132. The lever 458 is articulated at 460 with the link 223 which has articulation with the lever 221 arranged to move the centering rolls at station 122 to centering positions about the blank, as hereinbefore described. The link 223 is adjustable in length for accommodating different positions of the slide 146 on the bracket 132 and for different limits of movements of the centering rollers to accommodate blanks of different lengths, accomplished by forming said link of a plurality of sections, clamp-bolts and nuts 462 received through slots 463 in the sections of the link clamping the sections together in adjusted positions. (See Figs. 1, 38 and 39).

The link 310 has articulation at 309 with the lever 305 for reciprocating the flanging tool. The link 310 is adjustable in length so as to accommodate the different positions in which the stand 299 may be adjusted. The adjustment of the link is accomplished by forming the same in two telescoping sections, the outer section being provided with a tapering threaded end 466 having end-slots 467, a clamp-nut 468 for clamping the outer section to the inner section of the link. (See Fig. 10).

The actuation of the operating devices at station 124 is caused by the pins on the pin-disk 427 which contact an arm 471 fixed to a rock-shaft 472 journaled in bearings 473 and having an arm 474 fixed thereto and projecting therefrom, the arms and rock-shaft forming in effect a bell-crank lever. (See Figs. 1, 4, 5 and 40). The latter arm is articulated with a link 475. This articulation is preferably adjustable, as by clamping the articulating pin in adjusted positions lengthwise of a slot 476 in the arm 474 by means of a clamp-nut 477. This adjustment determines the limits of movement of the operating parts at station 124 operated by the bell-crank lever. The link 475 is extensible, and is shown as a two-part link, the sections of the link being connected by an adjusting clamp 478, the link-sections being adjustably clamped in the adjusting clamp by means of clamp-bolts 479. (See Figs. 2, 3 and 4). The other end of the link 475 is articulated with the lever 221 of the centering device at station 124.

The flexible hose 481 which leads to the valve 277, for feeding compressed air to the burner 271 at station 126, is arranged to have the passage therein obstructed during rotating movements of the carrier, for minimizing the intensity of heat during said movements. (See Figs. 1, 5, 8 and 9). This is exemplified as effected by squeezing the flexible hose. For this purpose the flexible hose is passed through an opening 482 in a hanger 483 depending from the bracket 131, (see Figs. 5, 8 and 9). A plug 484 is arranged to reciprocate in a bearing 485 in said hanger and to be normally retracted by means of a spring 486 bearing against a pin 489 in said plug. The cam disk 375 is provided with a cam 487 which engages the plug and thereby pinches the flexible hose for obstructing the passage therein.

The lever 378 for operating the clutch 354 has an extension 488 leading to the operator's position, so that, if desired, manual manipulation of the clutch 354 may be had.

Summarizing the operation of the present exemplification of my invention, it may be stated that the method and apparatus are intended primarily for operation on frangible blanks for vacuum-insulated vessels, such as vacuum insulated bottles, carafes, and the like.

The blank is inserted into a suction-chuck 79, at the operator's position 121. There is a series of these suction-chucks on a rotary carrier 51, rotation being imparted to the suction-chucks on the carrier. The rotary carrier has intermittent rotary movements imparted thereto and is arranged to be held in at-rest positions, six of these at-rest positions being shown, exemplified as the operator's station 121, the blank centering station 122, the severing station 123, the blank centering station 124, the blank preliminary heating station 125, and the blank flanging station 126.

The blank just inserted in the suction-chuck at the operator's station advances to the centering station 122, at which it is operated on by the centering device 137 (see Figs. 15 to 20 inclusive), comprising arms 138, 139, arranged to be automatically moved toward and from the axis of rotation of the blank. Blank scoring means are also preferably located at this station, comprising the scoring tool 171 mounted on the arm 172, and arranged to be automatically moved toward the blank by the cam 176 on the roller 165 actuated by the rotating blank.

The scoring tool provides the blank with a score, represented at 178 in Fig. 15, to determine the cracking line along which the refuse end 179 of the blank is to be removed.

The arms are brought into coactive relation with the blank by means of the lever 221, the arm 206, and keeper 204 coacting with the wiper 211 pivoted to the tail 213 of the arm 138, the lever 221 being actuated by a link 223, a lever 458 (see Fig. 1, and Fig. 10, Sheet 6), with which a rod 456 connects, the rod being actuated by a rocker-plate 452.

The blank next advances to the severing station 123, where it is subjected to a line of heat coincident with the scoring line (see Fig. 3, and Figs. 21 and 22, Sheet 8), the heat being projected from a flame-chest 226 through a slit 232 extending crosswise of the axis of rotation of the blank, for subjecting the blank to a constricted line of heat coincident with the scoring position thereon, whereby to crack off the outer or refuse end of the blank.

In the passage of the blank to the next station, the blank is subjected to a chilling blast projected through a slot 239 extending crosswise of the blank, for projecting a constricted line of chilling air upon the blank coincident with the scored and heated line, for cracking off the refuse end, in case such cracking off shall not have taken place at the heating-chest.

The blank next comes to at-rest position at the centering station 124. The devices operating on the blank at this station may be duplicates of the devices acting on the blank at station 122. The lever 221 of the centering device at station 124 is, however, preferably operated by means of a link 475 having connection with a bell-crank lever 471, 472, 474, actuated by the pins 429 of the pin-disk 427 of a Geneva movement device 426, arranged to intermittently rotate the table. (See Figs. 2, 3, 4 and 5).

If desired, the scoring tool at either station may be omitted. If omitted at the station 122, the heating of the blank along the scoring position across the axis of rotation of the blank takes place at the station 123, and the scoring for cracking off the refuse end of the blank takes place at the centering station 124.

The blank, with its end trimmed, then advances to the station 125, where the trimmed end of the blank is subjected to the heat of a flame for annealing the trimmed end of the blank, and next advances to the station 126, at which the blank is subjected to the high-heat action of a high-heat flame projected from the burner 271 toward the trimmed end diagonally with relation to the axis of the blank.

The blank is, just prior to its next movement, subjected to the action of a flanging tool 991, which is moved toward and from the blank along the axis of the blank for providing the trimmed and plastic end of the blank with a flange. The flanging tool is reciprocated by means of a lever 305, having articulation with a link 310, connected with the rocker-plate 452, (see Fig. 1, and Fig. 10, Sheet 6).

Just prior to arrival at the operator's station a finger 321 automatically closes the valve 109, (see Figs. 2 and 36, Sheet 2) for permitting removal of the blank from the chuck or dropping of the blank upon the table 134

Means are provided for adjusting the various operating devices toward and from the axis of rotation of the carrier.

The means for rotating the blanks, for intermittently rotating the carrier, and reciprocating the movable members of the operating devices at the various stations, comprise a hollow shaft 59, (see Figs. 2 and 4), to which a bevel friction gear 62 is fixed. The latter operates friction pinion 91, which are resiliently held toward the friction gear by springs 93, and are arranged to be moved away from the friction-gear at the operator's station by means of the cam 97, to permit cessation of rotation of the chuck in order to permit ready insertion of a fresh blank.

A pinion 325 is fast with the drive-shaft, and, by means of gearing, rotates one member of a clutch 354 at a high rate of speed, and one member of a clutch 355 at a reduced rate of speed, as will be apparent from the relative sizes of the gears shown in Figs. 7 and 8, Sheet 5. A cam-plate 375 operates a lever 378 for actuating the movable member of the clutch 354 which rotates the rocker-plate 452 (Figs. 10 and 11, Sheet 6), the latter movable member remaining in operative relation throughout a rapid single revolution. The movable member of the clutch 354 has a cam 388 thereon which actuates lever 404 to move the movable member of the clutch 355 into operative position, (see Figs. 7 and 8, Sheet 5), for actuating the pin-disk 427 of the Geneva movement device 426, the slot-disk 65 whereof is fixed to the rotary carrier for intermittently rotating the same.

The rotation of the clutch 354 is rapid and thereby completes the rocking to and fro of the rocker-plate 452 prior to arrival of the pin 429 (see Figs. 4 and 5) into coactive relation with the slot 430 of the Geneva movement device, and the pin 429 coacts with the bell-crank lever 471, 472, 474, prior to coaction of said pin with said slot, thereby completing movement of the reciprocating devices at the various stations about the rotary carrier at the end of the period of location of the blanks in at-rest positions and just prior to intermittent movement of the rotary carrier.

The pin-disk (see Figs. 3, 4 and 5), is also provided with means, shown as notches 434, coacting by means of levers 436, 439, and link 438, with a stop 128, which acts to lock the rotary carrier in at-rest positions.

The cam-disk 375 also acts on a plug 484 (see Figs. 3, 4, 5 and 9), for choking off the flow of fuel to the burner 271 during the intermittent rotations of the carrier.

Having thus fully described my invention, what I claim as new and desire to secure by Letters Patent, is:

1. The method of flanging a frangible blank which consists in forming a trimmed annular outer edge on said blank by scoring the rotating blank and applying heat across the path of rotation of said blank in substantially coincident lines on said blank, then heating said trimmed outer edge, and bending said heated outer edge laterally to form a laterally extending annular flange.

2. The method of flanging a flangible blank which consists in scoring said blank and applying heat in a constricted line to said blank, at different times, while rotating said blank and chilling said scored heated line to trim said blank with an outer annular edge, heating said trimmed outer edge to render the same plastic, and bending said plastic edge laterally outward to form an annular laterally extending flange.

3. The method of flanging a frangible blank which consists in rotating the blank, and scoring, heating and chilling said rotating blank along substantially coincident lines about said blank to trim said blank with an outer annular edge, heating said trimmed outer annular edge to render the same plastic, and bending said heated trimmed outer annular edge laterally outward to form an annular laterally extending flange.

4. The method of flanging the mouth-end of a frangible blank for a vacuum-insulated vessel which consists in rotating the blank, scoring and heating said rotating blank along substantially coincident lines at said mouth-end of said blank to trim said mouth-end with an outer annular edge, heating said trimmed mouth-end to render the same plastic, and applying inner radial pressure upon said mouth-end and said outer annular edge in the presence of heat to render said mouth-end inwardly tapering and to form said edge into an annular laterally extending flange.

5. In apparatus for manufacturing glassware of the character described, the combination of a carrier, blank-supports thereon, scoring means for the outer ends of the blanks supported by said blank-supports, heating means for said outer ends, and chilling means for said outer ends, said scoring means, said heating means and said chilling means positioned with relation to said carrier to cause coaction between said outer ends and said scoring means, said heating means and said chilling means in the order named.

6. In apparatus for manufacturing glassware of the character described, the combination of a carrier, blank-supports thereon, and trimming means and flanging means acting to laterally flange, coacting with the ends of the blanks supported by said blank-supports.

7. In apparatus for manufacturing glassware of the character described, the combination of a carrier, blank-supports thereon, and scoring means, heating means and flanging means acting to laterally flange, coacting with said blanks supported by said blank-supports.

8. In apparatus for manufacturing glassware of the character described, the combination of a carrier, blank-supports thereon, scoring means, heating means and flanging means acting to laterally flange, coacting with the blanks supported by said blank-supports, and means for adjusting said scoring means, heating means and flanging means toward and from said carrier.

9. In apparatus for manufacturing glassware of the character described, the combination of blank-centering means, cracking-off means for trimming the outer ends of the blanks, heating means for said outer ends, and reciprocating flanging means for laterally flanging said outer ends, said respective means located at at-rest positions, supporting means for the blanks, and means for intermittently moving said supporting means and for intermittently arresting said supporting means at said at-rest positions.

10. In apparatus for manufacturing glassware of the character described, the combination of blank-centering means, cracking-off means for trimming the outer ends of the blanks, heating means for said outer ends, flanging means for laterally flanging said outer ends, said respective means located at at-rest positions, said centering means and said flanging means each including a movable element, blank-supports, and means for intermittently moving said blank-supports into successive at-rest positions and moving said movable elements in at-rest positions in alternation.

11. In apparatus for manufacturing glassware of the character described, the combination of blank-centering means, cracking-off means for trimming the outer ends of the blanks, heating means for said outer ends, and reciprocating flanging means for laterally flanging said outer ends, said respective means located at at-rest positions, a valve for said heating means, a graduated scale by which to regulate said valve, supporting means for the blanks, and means for intermittently moving said supporting means and for intermittently arresting said supporting means at said at-rest positions.

12. In apparatus for manufacturing glassware, the combination of a rotary carrier, blank-supports mounted thereon, means for rotating said supports with relation to said carrier comprising a driving-gear and planetary gears having rotative connections with said supports, means for automatically interrupting rotative connection between said respective supports and said driving gear whereby to effect stoppage of rotation of a selective support, and automatic means for stopping planetary movement of said respective supports at given radial positions with relation to said supports.

13. In apparatus for manufacturing glassware, the combination of a rotary carrier, blank-supports thereon, operating means located about said rotary carrier, said operating means comprising movable parts for coaction with the blanks on said carrier, driving means, clutch means for connecting said driving means with said movable parts, clutch means connecting said driving means with said rotary carrier for intermittently rotating the same, and operating means for one of said clutches, the other of said clutches provided with coacting operating means operating in sequence with said first named operating means for operating said other of said clutches, whereby to operate said movable parts and intermittently rotate said carrier in alternation.

14. In apparatus for manufacturing glassware, the combination of a rotary carrier, a drive-shaft about which said rotary carrier rotates, blank-supports on said rotary carrier, shafts on said rotary carrier for rotating the latter, a gear about said drive-shaft for rotating said last-named shafts, a Geneva movement the driven member of which is journaled about said drive-shaft, and a clutch the respective members whereof have operative connection respectively with said drive-shaft and with the driving member of said Geneva movement, and arranged whereby to transmit intermittent rotary movements to said other of said members of said Geneva movement.

15. In apparatus for manufacturing glassware, the combination of a rotary carrier, operating means located at positions about said rotary carrier, said operating means including heating means comprising a supply-pipe and movable members arranged for coaction with blanks supported by said rotary carrier, said heating means including a movable control member, driving means including a clutch for intermittently operating said first named movable members, driving means including a clutch for intermittently rotating said carrier, a cam-plate, and means having operative connection therewith and with said clutches and said movable control member for intermittently operating said clutches and said movable control member in sequence in the order named.

16. In apparatus for manufacturing glassware, the combination of a rotary carrier, operating means located at positions about said rotary carrier, said operating means including heating means comprising a supply-pipe and a movable member arranged for coaction with blanks supported by said rotary carrier, said heating means including a movable control member, driving means including a clutch for intermittently operating said first named movable member, driving means including a clutch for intermittently rotating said carrier, a cam-plate, a lever coacting with said cam plate and with the movable member of said first named clutch, said last-named movable member provided with cam means, and a lever coacting with the latter and with the movable member of the other of said clutches, said cam-plate arranged to operate said movable control member and constructed and arranged for intermittently moving said movable member of said operating means, rotating said carrier and operating said movable control member in sequence.

17. In apparatus for manufacturing glassware, the combination of a rotary carrier, operating means located at positions about said rotary carrier, said operating means including heating means comprising a supply-pipe and a movable member arranged for coaction with blanks supported by said rotary carrier, driving means including a clutch for intermittently rotating said carrier, driving means including a clutch for intermittently operating said movable member, a cam-plate, a part coacting therewith for controlling the passage through said supply-pipe, a lever coacting with said cam-plate and with the movable member of one of said clutches, said last named movable member provided with cam means, and a lever coacting with the latter in sequence with the operation of said first named lever and with the movable member of the other of said clutches, constructed and arranged for intermittently rotating said carrier and intermittently moving said movable member of said operating means.

18. In apparatus for manufacturing glassware, the combination of a rotary carrier, blank-supports thereon, means located about said rotary carrier comprising movable elements coacting with said blanks, a drive-shaft about which said rotary carrier rotates, a rocker-plate journaled about said drive-shaft relatively to said drive shaft, driving means between said drive-shaft and said rocker-plate for intermittently rocking ing the latter, and operating connections between said rocker-plate and said respective movable elements for intermittently moving the latter.

19. In apparatus for manufacturing glassware, the combination of a rotary carrier, a Geneva movement the slot element whereof is fixed to said carrier, driving means for driving the pin element of said Geneva movement, a lock for said carrier, and means for operating said lock comprising a lever, and said pin element provided with coacting means for said lever.

20. In a machine for manufacturing glassware, the combination of an intermittently rotating carrier, a drive-shaft, a Geneva movement the slot-member whereof has connection with said carrier for intermittently rotating the latter, an operating part positioned with relation to said carrier, comprising a movable member coacting with said blank, and bell-crank mechanism having operative connection with said movable member, the pin-member of said Geneva movement arranged for coaction with said bell-crank lever and said slot-member, for operating the same.

21. In apparatus for manufacturing glassware of the character described, the combination of a rotary carrier, blank-supports on said carrier for supporting blanks in radial positions thereon, means for intermittently rotating said carrier and positioning said blank-supports in at-rest positions, centering means for said blanks, means for scoring said blanks, cracking-off means for said blanks comprising heating means directed toward the scoring position on the blank for cracking-off the refuse end of the blank, and thereby trimming the outer edge of the blank, heat projecting means for projecting heat upon said trimmed edge, and a flanging tool for flanging said trimmed and heated edge, said scoring means, said centering means, said cracking-off means, said heating means and said flanging tool located in at-rest positions with relation to said blank supports and operating on the blanks in the order named, and driving means, said centering means comprising a movable element, said movable element and said flanging tool having connection with said driving means for intermittently reciprocating the same alternately with the intermittent rotations of said carrier.

22. In apparatus of the character described, the combination of a rotary carrier, a drive-shaft, the axes of rotation of said rotary carrier and said drive-shaft being coincident, rotary blank-supports on said carrier, operating means for the blanks located at a plurality of positions about said carrier, said operating means comprising movable elements, means for intermittently rotating said carrier comprising a Geneva movement whose slot-member is on said carrier, a rocker-plate having operative connections with said movable elements, driving means between said drive-shaft and said rocker-plate including a clutch, driving means between said drive-shaft and the pin-member of said Geneva movement including a clutch, said first-named clutch rotating at substantially greater speed than said second-named clutch, and means for operating the movable member of said second-named clutch from the movable member of said first-named clutch.

23. In apparatus for operating on blanks of glassware, the combination of a rotary suction-chuck coacting with one end of the blank, and stationarily positioned blank-centering means coacting with the blank toward its other end and free of contact with the blank between said point of coaction and said first-named end.

24. In apparatus for operating on blanks of glassware, the combination of a rotary suction-chuck coacting with one end of the blank, stationarily positioned blank-centering means coacting with the blank toward its other end, stationarily positioned blank-scoring means for said other end, and connected means for automatically operating said blank-centering means and said blank-scoring means in correlation.

25. In apparatus for operating on blanks of glassware, the combination of a rotary suction-chuck coacting with one end of the blank and permitting relative angular movement between said blank and the axis of rotation of said suction-chuck, and blank-centering means comprising radially movable elements movable in a plurality of directions toward the center of said blank and coacting with the blank toward its other end determining said angular movement.

26. In apparatus for operating on blanks of glassware, the combination of a rotary suction-chuck coacting with one end of the blank and permitting relative angular movement between said blank and the axis of rotation of said suction-chuck, blank-centering means coacting with the blank toward its other end for determining said angular movement, and scoring means for the blank, said centering means provided with operating means for said scoring means.

27. In apparatus for manufacturing glassware, the combination of a rotary carrier, a shaft journaled thereon, a cup on said shaft, a seat for the blank in said cup, said seat having a flexible periphery for forming substantially air-tight connection with the blank, a passage in said shaft having connection with said seat, suction supply means, a rotary joint between said suction supply means and said shaft, and resilient means urging said suction supply means toward said shaft.

28. In apparatus for manufacturing glassware, the combination of a rotary carrier, a shaft journaled thereon, a cup on said shaft, a seat for the blank in said cup, said seat having a flexible periphery for forming substantially air-tight connection with the blank, a passage in said shaft having connection with said seat, suction supply means, a rotary joint between said suction supply means and said shaft, resilient means urging said suction supply means toward said shaft, and automatically interrupted means for rotating said shaft.

29. In apparatus for manufacturing glassware, the combination of a rotary carrier, a friction-gear whose axis of rotation is coincident with the axis of rotation of said carrier, a suction supply pipe received through said friction-gear, a suction reservoir on said rotary carrier with which said suction supply pipe connects, a shaft journaled on said carrier, a suction-chuck on said shaft, said shaft provided with a suction-passage, a rotary joint between said suction-reservoir and said shaft and passage, a friction pinion for rotating said shaft having operative connection with said friction-gear, resilient means for urging closing of said rotary joint, means for resiliently urging said friction-pinion into coactive relation with said friction-gear, and means for automatically moving said friction-pinion lengthwise away from said friction-gear.

30. In apparatus for manufacturing glassware, the combination of an intermittently rotatable carrier, a hollow drive-shaft, said carrier rotatable about said drive-shaft, blank-supports on said carrier comprising suction means for holding the blanks, a centrally located suction-reservoir having connection with said suction means, a suction-passage in said hollow drive-shaft, a rotary joint between said suction-passage and said reservoir, said connections between said reservoir and said suction means comprising rotary joints, and means on said carrier for resiliently causing coaction between the joint faces of said last-named rotary joints.

31. In apparatus for manufacturing glassware of the character described, the combination of a rotary carrier, rotary blank-supports thereon, said blank-supports comprising means for positioning one end of the blanks by contact solely with said one end, means for intermittently rotating said carrier and locating said blank-supports in at-rest positions, and centering means for centering the blanks at an at-rest position coacting with said blanks solely toward their other end to center the rotating blanks.

32. In apparatus for manufacturing glassware, the combination of a rotary carrier, blank-supports thereon, said blank-supports comprising suction means for holding one end of the blanks, means for rotating said blank-supports, means for intermittently rotating said carrier and locating the same in at-rest positions, and stationarily located centering means for the blanks comprising a movable member coacting with the blanks toward their other end for centering the blank about its axis of rotation.

33. In apparatus for manufacturing glassware, the combination of a rotary carrier, blank-supports thereon, said blank-supports comprising suction-chucks, suction means coacting with said chucks, means for rotating said chucks, said chucks arranged for chucking one end of the blanks with said blanks extending radially with relation to said carrier, means for intermittently rotating said carrier in at-rest positions, and centering means for centering the blanks coacting with said blanks toward their other ends when in at-rest position.

34. In apparatus for manufacturing glassware, the combination of a rotary carrier, means for intermittently rotating said carrier and placing the same in at-rest positions, blank-supports on said carrier, said blank-supports comprising suction-chucks, suction means coacting with said chucks, means for rotating said chucks, said chucks arranged for chucking one end of the blanks with said blanks extending radially with relation to said carrier, stationarily located centering means coacting with said blanks toward their other ends when in at-rest positions, and scoring means coacting with the centered blanks.

35. In apparatus of the character described, the combination of a slide, a standard having swiveling connection therewith, a pair of arms pivoted to said standard, said arms connected for combined opposite centering movements, blank-contacting rollers on said arms, and means for automatically moving said arms.

36. In apparatus of the character described, the combination of a slide, a standard having swiveling connection therewith, a pair of arms pivoted to said standard, said arms connected for combined opposite centering movements, blank-contacting rollers on said arms, scoring means for severance in said blank, operating means for said scoring means, and means for automatically moving said arms to place said operating means in operative relation.

37. In apparatus of the character described, the combination of a standard, a pair of arms pivoted to said standard, said arms connected for combined centering movements, a blank-contacting roller on one of said arms, means for automatically moving said arms into centering relations comprising a lever and a latch having pivots at substantial right angles to each other, and a lever actuated by said roller for tripping said latch.

38. In apparatus of the character described, the combination of a standard, a pair of arms pivoted to said standard, said arms connected for combined centering movements, a blank-contacting roller on one of said arms, means for automatically moving said arms into centering relations comprising a lever and a latch having pivots at substantial right angles to each other, a lever actuated by said roller for tripping said latch, a resilient stop for said last-named lever, and a spring for normally pressing said last-named lever toward said stop.

39. In apparatus of the character described, the combination of a standard, a pair of arms pivoted to said standard, said arms connected for combined movements, blank-contacting rollers on said arms, scoring means comprising a scoring-tool, means for adjusting said scoring-tool toward and from said rollers, and means for automatically moving said arms, one of said rollers provided with means for automatically moving said scoring-tool toward the blank position.

40. In apparatus for manufacturing glassware of the character described, the combination of a rotary carrier, blank-supports thereon, means for intermittently rotating said carrier and positioning said carrier in at-rest positions, and centering means for the blanks coacting with said blank-supports for centering the blanks about their axes of rotation, said centering means comprising scoring means acting on the centered blanks.

41. In apparatus for manufacturing glassware, the combination of a rotary carrier, blank-supports thereon, a plurality of arms, resting means on said arms coacting with the blank, means for coincidently moving said arms whereby to center the blank, scoring means for the blank, coacting means therefor mounted on one of said arms, said scoring means comprising a scoring tool, and means for adjusting said scoring tool lengthwise of the blank position.

42. In apparatus for manufacturing glassware, the combination of a rotary carrier, blank-supports thereon, means for intermittently rotating said carrier, centering means coacting with said blanks comprising an arm and a plurality of rotating supports for the blank thereon, an additional arm, a rotatable resting part for the blank on said last-named arm, said arms being connected for combined movements, and means for normally retracting said arms.

43. In apparatus for manufacturing glassware, the combination of a rotary carrier, blank-supports thereon, means for intermittently rotating said carrier, centering means coacting with said blanks comprising an arm and a plurality of rotating supports for the blank thereon, an additional arm, a rotatable resting part for the blank on said last-named arm, said arms being connected for combined movements, means for normally retracting said arms, and means for intermittently rotating said carrier and means for intermittently moving said arms toward each other, acting in alternation.

44. In apparatus for manufacturing glassware, the combination of a carrier, blank-supports thereon, means for intermittently moving said carrier and locating said blank-supports in at-rest positions, means coacting with said blanks in at-rest positions comprising arms, centering means thereon for the blank coacting with said blank and normally outside the path of the blank, means for moving said centering means toward said blank, and operating means for intermittently moving said carrier and moving said last-named means in alternation.

45. In apparatus for manufacturing glassware, the combination of a carrier, blank-supports thereon, means for intermittently moving said carrier and locating said blank-supports in at-rest positions, means normally outside the path of the blanks coacting with said blanks in at-rest positions comprising arms, centering means thereon for the blank coacting with said blank, means for moving said centering means toward said blank, tripping means for the latter for moving said centering means outside said path, and means for operating said tripping means having driving connection with the blank.

46. In apparatus for manufacturing glassware, the combination of an intermittently moving carrier, blank-supports thereon, means for intermittently moving said carrier and locating said blank-supports in at-rest positions, blank centering means for the outer ends of said blanks, scoring means for said outer ends, means whereby said centering means actuate said scoring means, a slide on which said centering means and said scoring means are located, and means for adjusting said slide toward and from said carrier.

47. In apparatus for manufacturing glassware, the combination of holding means for one end of a glass blank, arms arranged to coact with the other end of the glass blank for centering the glass blank in said holding means, a standard on which said arms are pivoted, means causing relative movement of said arms, a slide, and means for adjusting said standard on said slide for causing centering relation between said arms and the blank.

48. In apparatus for manufacturing glassware, the combination of a carrier, holding means for one end of a glass blank, arms arranged to coact with the other end of the glass blank on said carrier for centering the glass blank in said holding means, a standard on which said arms are pivoted, means causing relative movement of said arms, a slide, means for adjusting said standard on said slide for causing centering relation between said arms and the blank, and means for adjusting said slide toward and from said carrier.

49. In apparatus for manufacturing glassware, the combination of arms arranged to coact with a glass blank for centering the same, a standard on which said arms are pivoted, means causing relative movement of said arms, a slide, means for adjusting said standard on said slide for causing centering relation between said arms and the blank, scoring means on said standard, one of said arms comprising a roller rotated by said blank, and means actuated by said roller for actuating said scoring means.

50. In apparatus for manufacturing glassware, the combination of arms arranged to coact with a glass blank for centering the same, a standard on which said arms are pivoted, means causing relative movement of said arms, a slide, means for adjusting said standard on said slide for causing centering relation between said arms and the blank, scoring means on said standard, one of said arms comprising a roller rotated by said blank, means actuated by said roller for actuating said scoring means, and means for adjusting said slide toward and from said support for adjusting said centering means and said scoring means toward and from said carrier.

51. In apparatus for manufacturing glassware of the character described, the combination of a rotary carrier, blank-supports thereon, an axially movable flanging tool, means for intermittently rotating said carrier and successively positioning said blanks in at-rest positions co-incident with the axial position of said flanging tool, said flanging tool provided with spirally arranged ribs, means to cause relative rotation between said blank-supports and said flanging tool, and means for moving said flanging tool axially, whereby to cause coaction between said spiral ribs and said blanks to provide the end of said blank with an inner smooth flaring surface.

52. In apparatus for manufacturing glassware of the character described, the combination of a rotary carrier, blank supports thereon, an axially movable flanging tool, means for intermittently rotating said carrier and successively positioning said blanks in at-rest positions coincident with the axial position of said flanging tool, said flanging tool provided with spirally arranged ribs and with a shoulder, said spiral ribs continued on said shoulder, means for causing relative rotation between said blank-supports and said flanging tool, and means for moving said flanging tool axially, whereby to cause coaction between said spiral ribs and said blanks to flange the ends of said blanks outwardly and provide said ends with a smooth inner surface.

In testimony whereof, I have hereunto signed my name in the presence of two subscribing witnesses.

ERICK P. LINDAHL.

Witnesses:
 DAWSON E. BRADLEY,
 THERESA M. SILBER.

It is hereby certified that in Letters Patent No. 1,338,941, granted May 4, 1920, upon the application of Erick P. Lindahl, of Cincinnati, Ohio, for an improvement in "Methods of and Apparatus for Manufacturing Glassware," errors appear in the printed specification requiring correction as follows: Page 3, line 59, for the word "detached" read *attached;* page 11, line 21, claim 2, for the word "flangible" read *frangible;* and that the said Letters Patent should be read with these corrections therein that the same may conform to the record of the case in the Patent Office.

Signed and sealed this 8th day of June, A. D., 1920.

[SEAL]                                      M. H. COULSTON,
*Acting Commissioner of Patents.*

Cl. 49—7.